(12) United States Patent
Hintz et al.

(10) Patent No.: US 6,253,901 B1
(45) Date of Patent: Jul. 3, 2001

(54) LINKED CONVEYOR (SORTER) FOR THE SORTING OF SMALL CARGO UNITS

(75) Inventors: Andreas Hintz, Beckum; Gerhard Wylutzki, Oelde-Sünninghausen, both of (DE)

(73) Assignee: Beumer Maschinenfabrik, GmbH, Beckum (DE)

( * ) Notice: Subject to any disclaimer, the term of this patent is extended or adjusted under 35 U.S.C. 154(b) by 0 days.

(21) Appl. No.: 09/410,394

(22) Filed: Oct. 1, 1999

(30) Foreign Application Priority Data

Oct. 2, 1998 (DE) .............................................. 198 45 527

(51) Int. Cl.$^7$ .......................... B65G 47/10; B65G 47/46
(52) U.S. Cl. .................................................. 198/370.06
(58) Field of Search ........................ 198/370.06, 890.01

(56) References Cited

U.S. PATENT DOCUMENTS

| | | | |
|---|---|---|---|
| 3,912,071 | * 10/1975 | Nielsen | 198/370.06 |
| 4,712,965 | * 12/1987 | Canziani | 414/399 X |
| 4,801,000 | * 1/1989 | Canzaini | 198/390.06 |
| 5,690,209 | * 11/1997 | Kofoed | 198/370.06 |
| 5,701,992 | 12/1997 | Enomoto . | |

FOREIGN PATENT DOCUMENTS

| | | |
|---|---|---|
| 0 481 341 | 4/1992 | (EP) . |
| 0 662 433 | 7/1995 | (EP) . |
| 01048716 | * 2/1989 | (JP) .................................. 198/370.06 |

* cited by examiner

Primary Examiner—Christopher P. Ellis
Assistant Examiner—Kenneth W Bower

(74) Attorney, Agent, or Firm—Knobbe, Martens, Olson & Bear LLP

(57) ABSTRACT

A linked sorter for sorting small cargo units includes a plurality of conveying elements positioned consecutively in a conveying direction. The elements are flexibly connected to each other and form an endless conveying line for loading of small cargo units on each of the conveying elements. A cross-belt conveyor at a top end of each conveying element receives and delivers small cargo unit. The cross-belt conveyor has an endless-loop conveying belt which runs over two rollers that are separately positioned at and extend in the conveying direction of the sorter. An electric motor drives one of the rollers of the cross-belt conveyor so that a carrying segment of the cross-belt conveyor moves toward the predetermined delivery station. A support element is flexibly connected at a front section and a rear section and support elements of preceding and following conveying elements form a linked chain of support elements. The support element is supported and guided by running rollers at two parallel guiding rails that are separately positioned at a lower end segment that faces away from the cross-belt conveyor. At least one slot-shaped recess at the support element of at least every n-th conveying element has a rib extending at a predetermined distance to a wall of the slot-shaped recess and protrudes contact-free into the slot-shaped recess of the conveying elements. The rib has an electrical conductor that forms a primary winding and can be connected to a power source. At least one control line is routed along the conveyor and transfers control commands and control signals that originate from a central control device to a conveying elements. A section of the support element that forms the slot-shaped recesses is configured at least partly with ferrite and is equipped with a secondary winding that is magnetically coupled to the primary winding. At least one individual control device is assigned to the electric motor of a conveying element for driving and controlling at least one cross-belt conveyor. The individual control device receives control commands and control signals via the control line.

19 Claims, 5 Drawing Sheets

LINKED CONVEYOR (SORTER) FOR THE SORTING OF SMALL CARGO UNITS

BACKGROUND OF THE INVENTION

1. Field of the Invention

The invention relates to a linked conveyor that is also commonly called a sorter for the sorting of small cargo units, such as packages in post offices.

2. Description of the Related Art

Such sorters are known in different configurations. The basic principle is that small cargo units that occur in unsorted sequence, for example, with pieces of luggage in airports that must be transported, eventually only after an extended waiting period, to specific terminal gates, are sorted according to certain criteria by putting small cargo pieces on the sorter that have been coded for this purpose before they have been loaded on the sorter at least one loading station (if necessary by hand; generally, however, by means of a suitable loading device) and that are then transported by the sorter to a predetermined delivery station where they are suitably unloaded from the sorter from the side.

For this purpose the small cargo units that are to be sorted are individually placed on a transport position of the sorter before or while being placed on the sorter (if there are multiple loading stations), which is preferably on the next free conveyor position that approaches a loading station of the sorter in order to make the most efficient use of its conveying capacity.

Several possibilities/configurations are known that allow a defined delivery at the predetermined delivery station. For example, so-called "pushers" are known that are located to the side of the conveyor opposite a delivery station which push the small cargo unit off the sorter and which are activated perpendicular to the moving direction of the sorter. This type of unloading of small cargo units, however, is completely unsuitable for several types of cargo and higher conveying speeds because relatively high pusher activation speeds are needed due to the relatively short unloading time that will be available to the small cargo unit with a pushing power of proportionate force when the pusher pushes the small cargo unit.

Another known possibility of unloading of small cargo units consists in pivoting a stationary deflector arm at the delivery station. However, this unloading or delivery method can be seen to work well only for sorters with a relatively slow conveying speed, and even then will have the disadvantage that a small cargo unit that is to be unloaded will be turned about its vertical axis relative to its conveying speed, and even then will have the disadvantage that a small cargo unit that is to be unloaded will be turned about its vertical axis relative to its conveying direction if it hits an inwardly pivoting deflector so that, particularly with relatively long small cargo units, an uncontrolled relative movement may occur between the small unit, on the one hand, and the sorter and respective delivery station on the other.

For the aforementioned types of sorters it is obviously not necessary to configure the sorter as a linked conveyor, although this is generally useful for the aforementioned modes of delivery operation, as well.

In addition, so-called tilting-shell sorters are known that are configured as linked conveyors where the top-end segment of each conveying element carrying the carrier body or carrier plate can be pivoted from its generally more or less vertical transport position into a tilted unloading position at the delivery station causing the small cargo unit it contains to slide off laterally at the predetermined delivery station. Different configurations are known for such tilting-shell sorters. Their underlying principle is that at each delivery station a stationary shell body device is located that can possibly engage an approaching cam device in such a manner that the shell body is pivoted in the aforementioned manner and returned (and locked) to its upright transport position after passing the delivery station of the conveying element.

Even with this type of tilting-shell sorter a rolling over (tumbling) of the unloaded small cargo unit can occur, although meanwhile several configurations have become known that permit a rather more defined and gentle delivery. This is, for example, the case whenever the shell body is simultaneously lowered during the unloading process. Still, even with these types of shell body conveyors it can generally not be avoided that the small cargo units to be unloaded are dumped onto a lower level, which can be disadvantageous for fragile cargo.

In order to be able to unload particularly fragile small cargo units from a sorter precisely at the predetermined delivery station, without having to overcome frictional resistance that frequently causes the small cargo unit to twist during the unloading procedure and without the risk of rolling over, precisely and on target as well as at essentially the same level and thus, in general, extremely gently land accurately, sorters have been developed whose loading and unloading positions consist of so-called crossbelt conveyors.

These cross-belt conveyors feature endless conveyor belts that run over two rollers or cylinders that are positioned apart from each other and that extend in the direction of the conveying movement of the sorter. One of these rollers is to be driven (possibly via a transmission) by an electric motor that is located at the conveying element in question (or at an adjacent element) and thus rotates synchronously with the sorter in such a way that the carrying cross-belt conveyor of a conveying element is supported by a fixture that is connected by a element, thereby forming a linked chain made up of all the support fixtures. The fixture is supported and guided at its lower end segment that faces away from the cross-belt conveyor by two (support and guide) rails that are positioned apart from and parallel to each other and that determine the predetermined conveying distance.

When a conveying element on this type of conventional sorter carrying a small cargo unit approaches the predetermined delivery station, the drive of the cross-belt conveyor receives a start signal, once the small cargo unit reaches the delivery station, and is connected to a power source so that the small cargo unit in question can be carried off, laterally and perpendicular to the conveying direction of the sorter, by the cross-belt conveyor toward the delivery station at undiminished speed that, today, is relatively high. The small cargo unit is received (possibly via a slide) by a receiving device (that may be a container or another conveyor) whose receiving surface is, if possible preferably at the same level as the upper surface of the carrying segment of the cross-belt conveyor.

The electric motors of the cross-belt conveyor receive their electric (drive) power via electrical lines that are connected to a stationary power rail through sliding contacts of the conveyor element in question. The power rail is connected to an electrical power source, as is known, for example, in relation to streetcars or underground trains and that is regularly used whenever a mobile unit that features an electrical drive must be supplied with electrical energy from a stationary power source.

It is a significant disadvantage of this known sorter that its sliding contact system is subject to considerable wear since the sliding contacts move relative to the power rail and are permanently pressed hard against it, which inevitably causes a significant amount of friction and heat to develop. The known conventional sorter is, therefore, very expensive not only in regard to installation costs but also in regard to the required maintenance and repair. In addition, any maintenance and repair will render the sorter, and thus the entire conveying system, inoperative, a circumstance that is already rather problematic in sorting installations of the postal organization or mailorder businesses and that is entirely unacceptable for luggage distribution and their respective sorting installations in airports.

In order to avoid these and other disadvantages, it has already been suggested to equip conventional sorters with friction wheels that are set into rotary motion by the rails when the sorter is operated and that interface with generators that produce the electrical power required for the operation of the cross-belt conveyors. While in this type of sorter the significant wear between the sliding power contacts and the power rail (and the pollution caused by it) has been eliminated, it has been found that significant wear occurs between the friction wheels and the support and guide rails, on the one hand, and between the friction wheels and the generators, on the other, due to the inevitable slippage causing not only also significant pollution but also, as a consequence, frequent maintenance and repair work. This is the case, if for no other reason, because the wear from friction continuously causes the frictional contact between the friction wheels and the rails and the respective generators to be reduced, causing the power generated by the generators to vary from conveying element to conveying element, an, in certain cases, may be too low to supply the power required to actuate a drive for a cross-belt conveyor.

SUMMARY OF THE INVENTION

The present invention is based on the task of improving a sorter of the above-described type preserving as many as possible of the advantages of the conventional sorter as are known from the article "High performance Sorter for Short Delivery Times of a Distribution Center in Como" (q.v., FIG. 1) in the journal "Logistik im Uternehmen," 12 (1998), No. 9—September, of the Sandvik Corporation, and avoiding as much as possible the aforementioned disadvantages and other disadvantages with the intention of developing, if possible, variably, the targeting of one delivery station in such a way that one conveying element unloads its small cargo unit (a little) later (or earlier) than the conveying element that has previously unloaded its small cargo unit at the same delivery station, so that, given the required data entry and control, a consecutive unloading of the delivered small cargo units can be achieved at one or every delivery station (for example, into a receiving container positioned there), and, thus, a very effective delivery (particularly of relatively small cargo units) can be achieved, where the sorter according to the invention should also be insensitive to humidity, allowing its unproblematic application as a luggage conveyor between airport terminals, etc., even if the conveying section is partly unprotected and exposed to the weather.

This task is solved by a linked sorter for sorting small cargo units that includes a plurality of conveying elements positioned consecutively in a conveying direction. The elements are flexibly connected to each other and form an endless conveying line for loading of small cargo units on each of the conveying elements. A cross-belt conveyor at a top end of each conveying element receives and delivers small cargo unit. The cross-belt conveyor has an endless-loop conveying belt which runs over two rollers that are separately positioned at and extend in the conveying direction of the sorter. An electric motor drives one of the rollers of the cross-belt conveyor so that a carrying segment of the cross-belt conveyor moves toward the predetermined delivery station. A support element is flexibly connected at a front section and a rear section and support elements of preceding and following conveying elements form a linked chain of support elements. The support element is supported and guided by running rollers at two parallel guiding rails that are separately positioned at a lower end segment that faces away from the cross-belt conveyor. At least one slot-shaped recess at the support element of at least every n-th conveying element has a rib extending at a predetermined distance to a wall of the slot-shaped recess and protrudes contact-free into the slotshaped recess of the conveying elements. The rib has an electrical conductor that forms a primary winding and can be connected to a power source. At least one control line is routed along the conveyor and transfers control commands and control signals that originate from a central control device to a conveying elements. A section of the support element that forms the slot-shaped recesses is configured at least partly with ferrite and is equipped with a secondary winding that is magnetically coupled to the primary winding. At least one individual control device is assigned to the electric motor of a conveying element for driving and controlling at least one cross-belt conveyor. The individual control device receives control commands and control signals via the control line

BRIEF DESCRIPTION OF THE DRAWINGS

The invention is explained below on the basis of embodiment examples and in reference to a drawing, where the subsequent description of the figures obviously also contains non-specialized parts that pertain to the invention in general, and not only to the embodiment examples shown in the drawing. The various figures of the drawing, which has been kept mainly schematic for the sake of clarity, are:

FIG. 6a is an enlarged drawing of FIG. 6, according to the scale of FIG. 3a.

DETAILED DESCRIPTION OF THE PREFERRED EMBODIMENT

Figure 1:
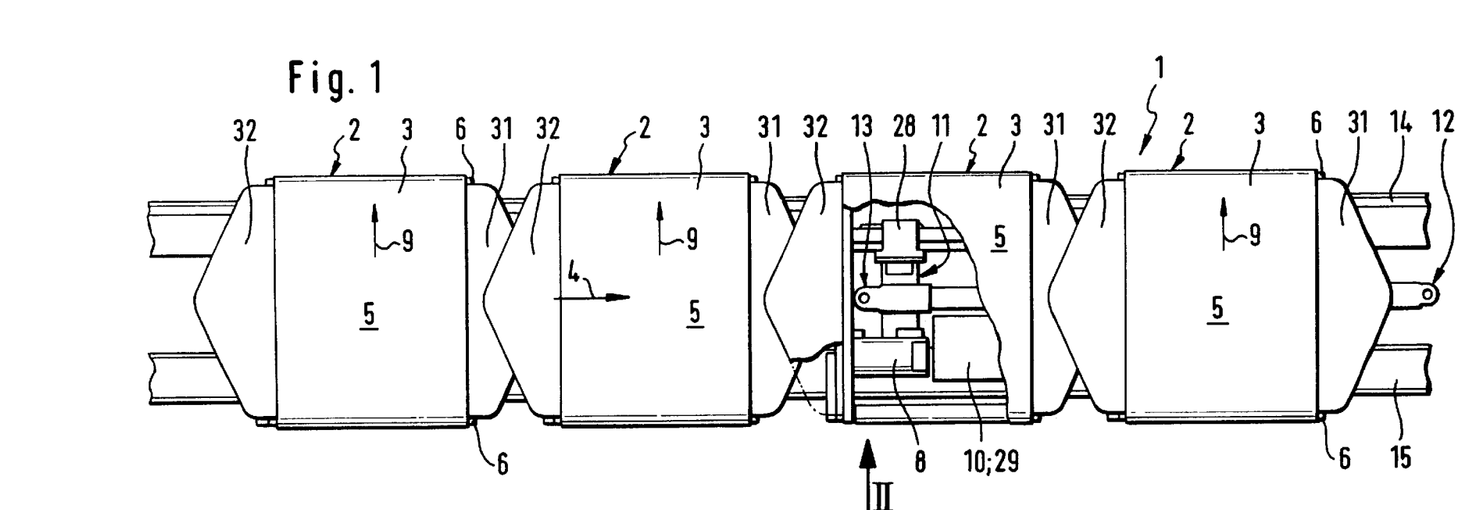
FIG. 1 is a plan view of a linear section (four conveying elements) of a sorter according to the invention viewed in the direction of the arrow I in FIG. 2.
Figure 2:
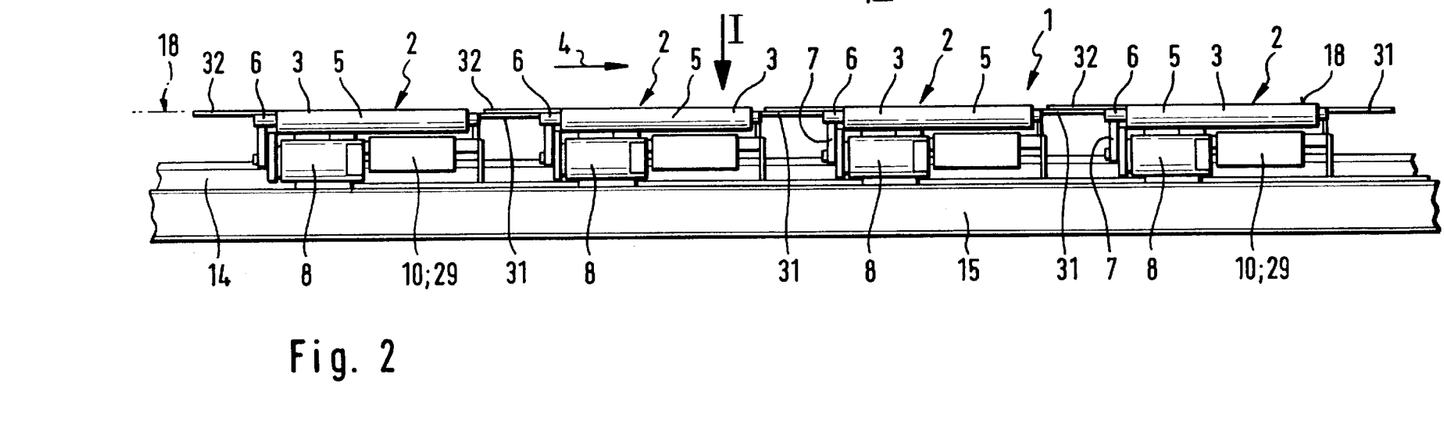
FIG. 2 is a side view of the drawing according to FIG. 1 viewed in the direction of the arrow II in FIG. 1.
Figures 3, 4, 5, 6, 7:
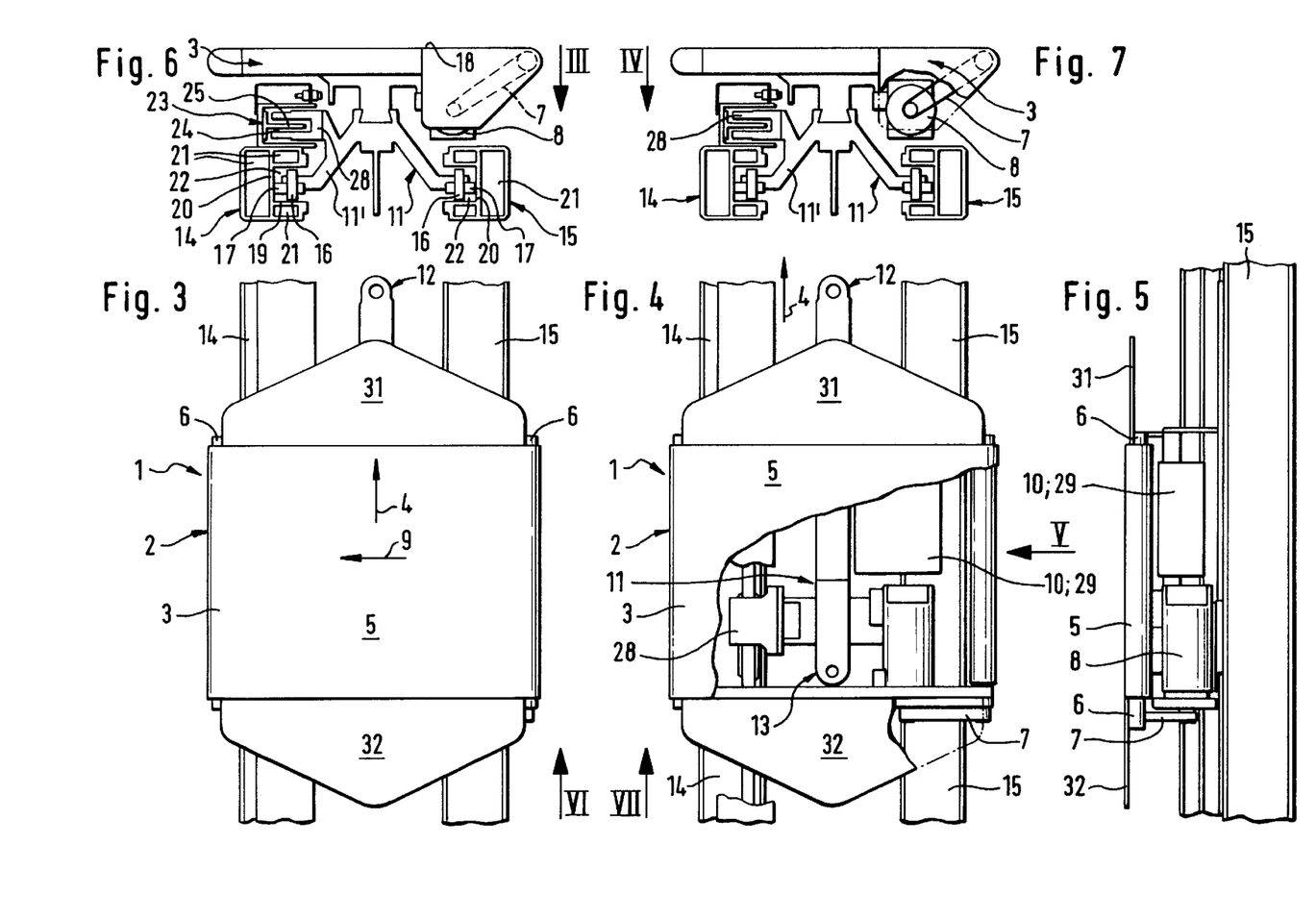
FIG. 3 is a plan view, which has been enlarged in comparison to FIGS. 1 and 2, of a conveying element viewed in the direction of the arrow III in FIG. 6.
FIG. 4 is a drawing according to FIG. 3, wherein part of the conveyor belt, the cross-belt conveyor, and the holding plate that follows the cross-belt conveyor in its conveying direction have been cut away; also a plan view in the direction of the arrow IV in FIG. 7.
FIG. 5 is a side view of the drawing of FIG. 4 viewed in the direction of the arrow V in FIG. 4.
FIG. 6 is a front view in the direction of the conveying direction of the sorter viewed in the direction of the arrow VI in FIG. 3.
FIG. 7 is a drawing according to FIG. 6, in which, in the upper right part, a part of the casing of the conveying element has been cut away.
Figure 3A:
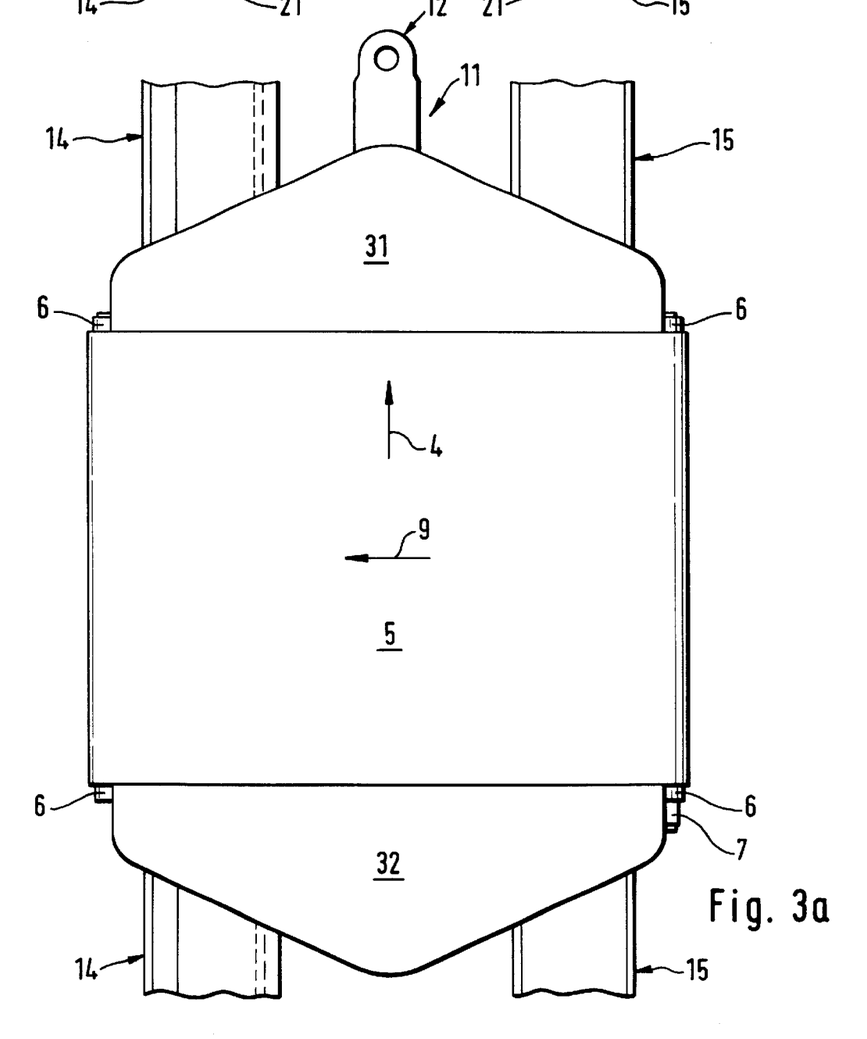
FIG. 3a shows the drawing according to FIG. 3 to a larger scale.

The FIGS. 1 and 2 each show a short linear section of the conveying line of a linked conveyor that overall is designated by reference number 1 and that has been and will be called a sorter for the sorting of small cargo units, which, for the sake of greater clarity, have not been shown in the drawing, and which, after having been separated at a known loading station, are to be individually loaded there on an available loading space on the sorter 1 that approaches the loading station, and which are each to be unloaded from the sorter at one (of many) unloading stations (that are also not shown in the drawing). In this process, each conveying space that is essentially constituted by a conveying element 2 and respectively also by its cross-belt conveyor 3 is occupied by at most one individual small cargo unit, where it is also possible to support a longer small cargo unit with two conveying elements 2 and hold it during the conveying process.

The supporting surface features two additional essentially triangular supporting sections 31 and 32 that are permanently attached to each conveying element 2.

The sorter 1 features many identically configured flexibly link-interconnected conveying elements 2 that are configured consecutively in the conveying direction 4 of the sorter 1 forming an endless conveying line. The conveying elements each feature at their upper ends a cross-belt conveyor 3 for reception and respective support, and later unloading at a delivery station of a small cargo unit that has been loaded at a loading station.

Each cross-belt conveyor 3 features an endless conveying belt 5 that loops around two rollers 6, which are positioned apart from each other and extend in the conveying direction 4 of the sorter 1, of which one roller 6 is to be driven via a chain or toothed belt drive 7 via an electric motor 8 located on each conveying element 2 in such a manner that the carrying segment of the conveying belt 5 of the cross-belt conveyor in question 3 moves in the direction of arrow 9 and is controlled by a "smart" controller device 10 or 29 toward the targeted delivery station and respectively unloading side after activation of the electric motor 8.

The cross-belt conveyor 3 of each conveying element 2 is attached to a support element that is indicated overall by the reference number 11, forming a linked chain out of all the support elements 11 and that at its front end section 12 and its rear end section 13 is flexibly connected to the support element 11 of the preceding and respectively following conveying element 2, and that is supported and guided by means of the rotating cylinders 16 and 17 at its lower end section that faces away from the cross-belt conveyor 3 on two parallel support and guide rails 14 and 15, which are positioned apart from each other and which determine the predetermined conveying line, where the cylinder 16, rotating around shafts that extend parallel to the conveying plan 18 of the sorter 1, and the cylinder 17, rotating around rotating shafts that are perpendicular to the conveying plane 18, are both rotatably attached to the support element 11 and rotate during operation. They cylinders 16, 17 rotate along the conveying lien in closed (running and support) ribs 19 and 20 of the two rails 14 and 15, respectively. The support ribs 19, 20 follow the conveying line in the conveying direction 4 of the sorter 1 and are positioned and respectively configured at the inner side of a rail 14 or 15, respectively, that faces the corresponding other rail.

The two rails 14, 15 are produced from a sufficiently rigid light-metal alloy as rectangular extruded profiles mainly for reasons of stability and solidity. Their stability is increased by resulting chambers 21 and the respective walls that form the chambers 21 and by thereby increased section modulus. It is obvious that, for the functions of support and running surface, only the chambers 22 of the rails are used that are open toward the inside, where in particular the large chamber 21 of a rail 14 or 15 that is locate toward the outside could also serve as the receiver of a device 23, for the contact-free supply and respective transmission of power, which is located above the rail 14 in the described embodiment examples and that is described in further detail below. For the purpose of describing the present invention this embodiment variant has been selected because it can be represented more clearly than an extremely compact version that otherwise would actually have been preferred and in which the device 23, for the supply and respective transmission of power, is integrated into an arm 11' of the support element 11 from where it protrudes into the outer chamber 21 of the rail 14.

Each support element 11 features a slot-shaped recess 24 into which a running and support rib 19 and respectively 20 of the rail 14 (and respectively of the lower rail 15) could extend that is configured as a cantilever, but into which in the present configuration a special, integrated, flange-shaped rib of the running rail 14 extends that is parallel to the ribs 19 and that has been called inductive rib 25, where this inductive rib extends into rail 14 in such a way that it runs at a distance with the slot wall 26 that forms the inside of the slot-shaped recess 24.

The inductive rib 25 that extends without contact into the slot-shaped recess 24 of the support element 11 is equipped with an electrical conductor 27 that constitutes a primary winding and can be connected or is connected to an AC power source.

Section 28 of the support element 11 that forms the slot-shaped recess 24 forming a lateral protrusion of the arm 11 is ferritic and forms the core of a secondary winding (not shown) that is magnetically coupled to the primary winding 27.

Figure 6A:
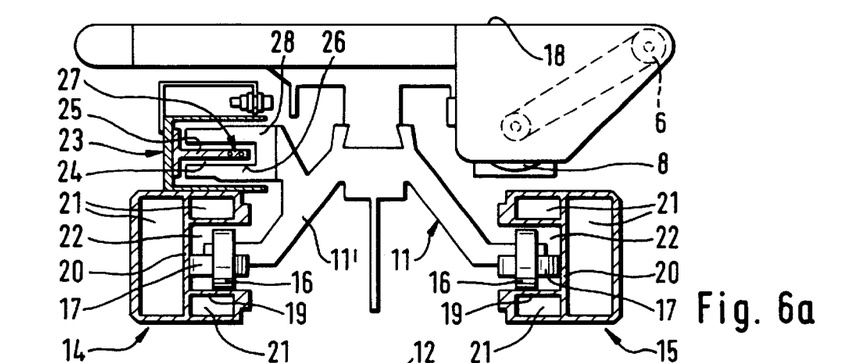
Figure 8:
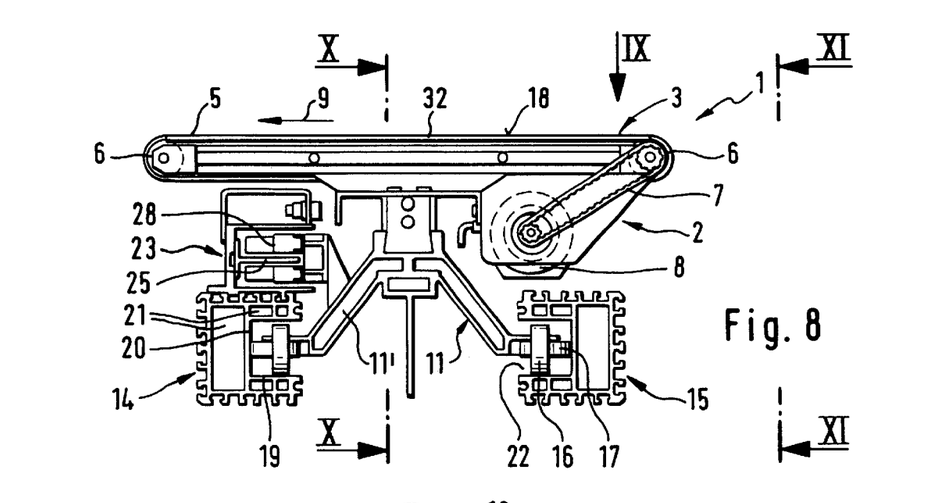
FIG. 8 is a less schematic drawing according to FIG. 6 and respectively FIG. 7 viewed in the direction of the arrow VIII in FIG. 9.
Figure 9:
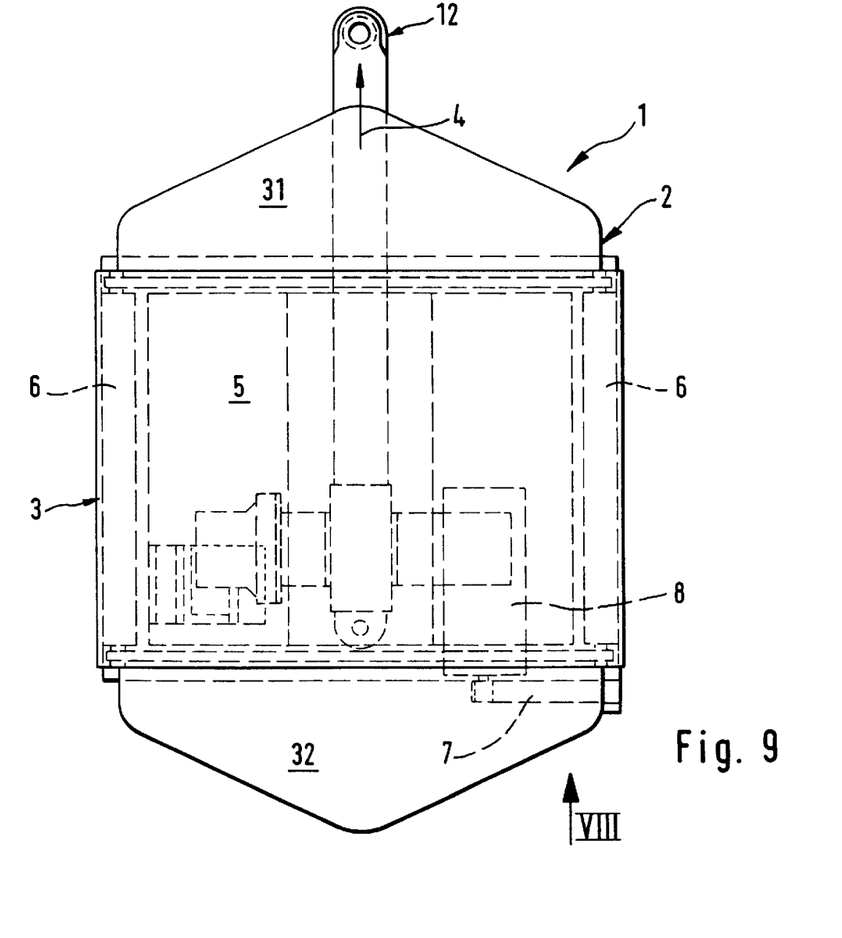
FIG. 9 is a drawing that in its essential components corresponds to FIG. 3 (without rails) drawn according to FIG. 8 and viewed in the direction of arrow IX in FIG. 8.
Figure 10:
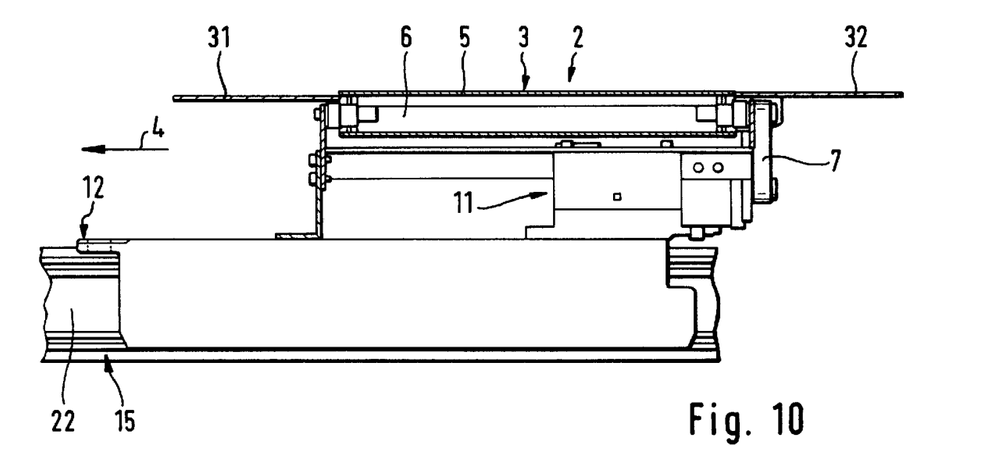
FIG. 10 is a side view of the drawing according to FIG. 8 viewed in the direction of the intersecting line X—X in FIG. 8.
Figure 11:
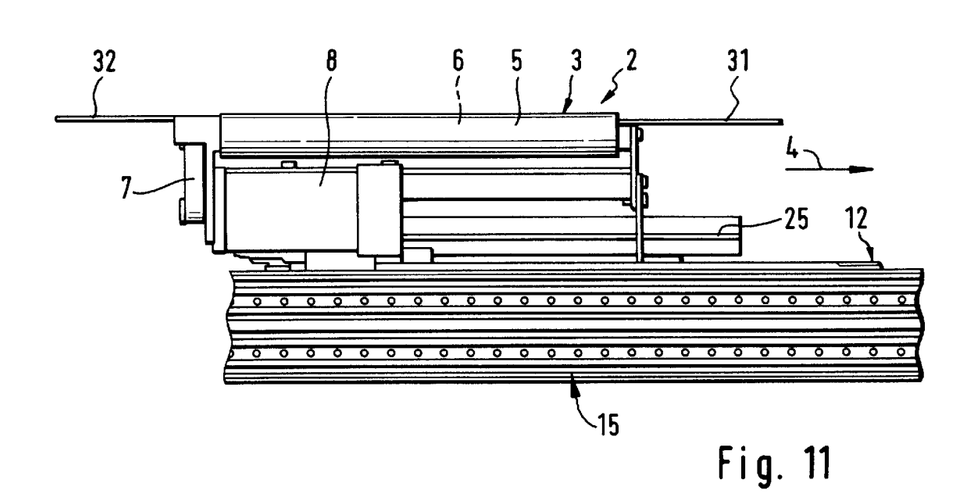
FIG. 11 is a drawing that corresponds to that of FIG. 10 viewed in the direction of XI—XI in FIG. 8.

An individual control device 29 is assigned to the electric motor 8 that is provided for controllable actuation of the cross-belt conveyor 3 that is to receive control commands or signals via a control line (not shown in detail in the drawing). For the purpose of information transfer the control line is routed along the conveyor. Through its control commands or signals can be sent and transferred from a central control unit that is preferably equipped with a computer to the conveying elements 2 and their respective control devices 29. As can be seen particularly in FIG. 6a, the slot-shaped recess 224 is essentially U-shaped and the inductive rib 25 is configured as a flange of constant thickness, where the distance between the inductive rib 25 and the slot wall 26 that almost surrounds the inductive rib like a box is circumferentially constant and just small enough to reliably avoid contact between the inductive rib 25 and the slot-shaped wall 26. In the embodiment examples shown, the slot-shaped recess 24 of each conveying element 2 is open to one of the sides of the sorter 1. However, it could just as easily be open in an upward direction, or downwardly, and, if necessary, toward the inside, the latter configuration being difficult to design and thus not useful.

It should be mentioned as well that the control line that is routed along the conveyor is usefully routed ion a rail 14 or 15; however, it can just as easily be routed separately from it, if necessary.

The individual control devices 29, which are attached to the conveying elements 2 and which can accordingly be moved together with them, each transfer, among other things, information about the actual instantaneous position of the given conveying element 2 and/or its load, etc. to the central control unit (not shown). The information or data that are transferred from an individual control unit 29 to the central control unit are also at least partially transferred to other individual control units 29 that are attached to other (further) conveying elements 2, and they are not only received but also used for the optimal operation of the sorter 1. For this reason, the individual control units 29 are each equipped with the computer containing software that makes it possible, among other things, to variably target each delivery station so that particularly with relatively small cargo units, the desired precise and targeted delivery can be achieved at each predetermined delivery station (which must be as wide as the widest or longest small cargo unit) at certain intervals in the conveying direction and in such a manner that the small cargo units delivered to a specific delivery station are unloaded in a straight line "like pearls on a string," provided that this is useful and therefore desirable under the given conditions.

It should also be mentioned that in the sorter according to the invention, each conveying element 2 does not have to be equipped with a device 23 for energy supply or energy transfer by the rather, for example, only each third, fourth or fifth conveying element 2 can be configured accordingly and that the conveying elements 2 between elements with the energy supplies can be connected via electrical wiring with a conveying element 2 equipped with a device 23. During development it has been found, however, that it is rather useful, and therefore, preferred under various considerations, to configure all conveying elements 2 in the same manner, resulting in a modular configuration and thus a lined conveyor 1 with conveying elements 2 that can be interchanged as needed, which obviously has several advantages.

The conductor 27, which constitutes the primary winding of the energy transmission in the preferred refinement of the present invention, can be actuated both by electrical energy for the operation of the electric motors 8 and by control-related electrical information, where the individual control devices 29 in this case feature a separation means or a separation device such as, a filter or filtering device by means of which the control-relevant information can be separation from the transmitted electrical energy.

It is useful in this respect to allocate to the primary winding 27 of the energy transmission a coupling device that can, for example, also be configured as a filtering device, by means of which the electrical energy to be transferred can be combined with the control-relevant information in the form of electrical signals before their transmission to the secondary winding or the individual secondary windings.

It needs to be emphasized again that the windings wrap around the ferritic segments 28 of the devices 23 or of the inductive rib 25 acting as ferrite cores.

Incidentally, the contact-free energy transmission accomplished inductively through magnetic coupling is preferably implemented with a higher frequency in the so-called middle frequency range, wherein the embodiment examples operate at 25 kHz.

It is obvious, according to the invention, that a sorter 1 configured as a linked conveyor avoids all of the disadvantages of the state of the art, and that preserving all of the advantages of future state of the art, even more advantages can be achieved. With the sorter according to the invention, even very impact-sensitive small cargo units can be loaded, conveyed and, above all, unloaded extremely gently from the sorter at the intended delivery station, without friction and at the same level, where the absence of frictional resistance completely eliminates any danger of twisting or/and tumbling during delivery. In addition, not only a precise and gentle delivery is possible, but also a corresponding precise delivery for variable delivery characteristics at one delivery station.

Since in the area of energy transmission or energy generation no relative movement occurs under friction (and high temperature), the wear and tear of the state of the art and the pollution caused by it do not occur and the sorter according to the invention is, in addition, so insensitive to humidity that it can even be operated underwater.

Even though driving cross-belt conveyors requires considerable driving power, in particular for larger sorters and for relatively heavy loads, because the so-called initial breakaway resistance of a cross-belt conveyor from stand still is considerable and must be overcome within a very short time due to the relatively short width of the delivery station, and the relevant cross-belt conveyor(s) must be accelerated quickly to top speed so that the relevant small cargo unit can be delivered precisely to the required delivery station, it has been found that, surprisingly, the required driving performance can be transmitted by the rails 14 or 15 selected for this purpose even for large scale sorters, particularly if they are configured in the aforementioned manner.

Generally, it remains to be mentioned that the contact-free transmitting electrical power output—after separation from the preferably simultaneously transmitted information, from which, in the individual control devices 29, the required control signals are computed and generated—can be attained in a useful manner within the individual control devices 29 of the conveyor elements 2 so as to provide the required electrical energy in the appropriate form for the electric motors 8 at any time. In the embodiment examples shown in the drawings, the voltage that is transmitted as an alternating current is rectified because the electric motors 8 are configured as DC motors.

Last but not least, the production cost of the sorter according to the invention is significantly lower than that of the closest state of the art. Since the maintenance and repair costs are also significantly lower, the combined investment and operating cost is significantly lower than the state of the art and it is also surprisingly possible—as already mentioned—to operate even sorters with longer conveying distances, such as those, for example, between the terminals of an airport for luggage conveyance and for systems that have not yet been considered for inductive contact-free energy transmission by such conveying systems, but rather (for example in PCT-GB92/00220) for "individual vehicles," if at all, such as the trolley of a crane, the suspended cabin of a monorail train or individual robots that must swivel around an axis after covering a certain distance in order to work at that position, but not for transport systems with a multitude of (conveying) elements that could be moved simultaneously and consequently be supplied with energy.

What is claimed is:

1. A linked sorter for sorting small cargo units that are loaded on the sorter at at least one loading station and unloaded from the sorter at a predetermined delivery station from a number of delivery stations, comprising:

a plurality of conveying elements positioned consecutively in a conveying direction, flexibly connected to each other and forming an endless conveying line for loading of small cargo units on each of the conveying elements;

a cross-belt conveyor at a top end of each conveying element for receiving and subsequent delivering of a small cargo unit, the cross-belt conveyor having an endless-loop conveying belt which runs over two rollers that are separately positioned at and extend in the conveying direction of the sorter;

an electric motor that drives one of the rollers of the cross-belt conveyor, that is attached to the conveying element, and that is operable by a control device, the electric motor drives the cross-belt conveyor in such a manner that a carrying segment of the cross-belt conveyor moves toward the predetermined delivery station;

a support element that supports the cross-belt conveyor of a conveying element, the support element flexibly connected at a front section and a rear section, support elements of preceding and following conveying elements forming a linked chain of support elements, the support element supported and guided by running rollers at two parallel guiding rails that are separately positioned at a lower end segment that faces away from the cross-belt conveyor and that determine a predetermined conveying line, said running rollers run in the conveying direction along the conveying line in endless ribs of the two parallel guiding rails that are positioned and respectively configured at an inner side of one of the two parallel rails that faces the corresponding other rail;

at least one slot-shaped recess at the support element of at least every n-th conveying element, in which a rib extends at a predetermined distance to a wall of the slot-shaped recess and protrudes contact-free into the slot-shaped recess of the conveying elements, wherein the rib has an electrical conductor that forms a primary winding and can be connected to a power source;

at least one control line routed along the conveyor, the control line transferring control commands and control signals that originate from a central control device to a conveying elements, wherein a section of the support element that forms the slot-shaped recesses is configured at least partly with ferrite and is equipped with a secondary winding that is magnetically coupled to the primary winding; and at least one individual control device assigned to the electric motor of a conveying element for driving and controlling at least one cross-belt conveyor, the individual control device receiving control commands and control signals via the control line.

2. The sorter of claim 1, wherein each conveying element has a slot-shaped recess.

3. The sorter of claim 1, wherein the rib is shaped as a flange having a substantially constant thickness.

4. The sorter of claim 1, wherein the slot-shaped recesses are substantially U-shaped.

5. The sorter of claim 1, wherein the distance between the rib and the wall of the slot-shaped recess is substantially constant.

6. The sorter of claim 5, wherein the distance is at most a few millimeters and configured to avoid contact between the rib and the wall of the slot-shaped recess during operation.

7. The sorter of claim 1, wherein the control line extends along one of the guiding rails.

8. The sorter of claim 1, wherein the slot-shaped recess of a conveyor element is open at a side facing the sorter.

9. The sorter of claim 1, wherein each individual control device assigned to a conveyor element conveys operational parameters of the conveyor element to the central control device.

10. The sorter of claim 9, wherein at least one of the individual control devices receives and processes the operational parameters send by another individual control device.

11. The sorter of claim 1, wherein the electrical conductor that forms the primary winding provides electrical energy to drive the electric motor and conducts control-relevant electrical control signals, and wherein the individual control device comprises a filter device that separates the electrical control signals from the provided electrical energy.

12. The sorter of claim 11, further comprising a coupling device which is assigned to the primary winding for electrical energy transfer and which combines control-relevant electrical control signals and the electrical energy to be transferred prior to transferring the electrical energy and the control-relevant electrical control signals to the secondary winding.

13. The sorter of claim 1, wherein the windings wrap around ferritic segments of the ribs, the ferritic segments acting as ferrite cores.

14. The sorter of claim 1, wherein the conveyor elements are similarly configured and form modular units of the sorter.

15. The sorter of claim 1, wherein contract-free energy transmission is accomplished with a higher frequency in a middle-frequency range.

16. The sorter of claim 15, wherein the contract-free energy transmission occurs at a frequency of about 25 kHz.

17. The sorter of claim 1, wherein the individual control devices each are associated with a computer which calculates control signals for driving the respective cross-belt conveyor.

18. The sorter of claim 1, wherein the individual control devices process received contract-free transferred energy.

19. The sorter of claim 18, wherein the individual control devices convert the received energy to a direct current, and wherein the electric motors are configured for direct current.

* * * * *